United States Patent
Connell, II et al.

(10) Patent No.: US 11,361,639 B2
(45) Date of Patent: Jun. 14, 2022

(54) GUNSHOT DETECTION SYSTEM WITH LOCATION TRACKING

(71) Applicant: Johnson Controls Fire Protection LP, Boca Raton, FL (US)

(72) Inventors: Thomas Wysong Connell, II, Westminster, MA (US); Alan Levin, III, Bolton, MA (US); Timothy L. Ficarra, Billerica, MA (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 0 days.

(21) Appl. No.: 16/968,945

(22) PCT Filed: Feb. 14, 2019

(86) PCT No.: PCT/IB2019/051210
§ 371 (c)(1),
(2) Date: Aug. 11, 2020

(87) PCT Pub. No.: WO2019/159106
PCT Pub. Date: Aug. 22, 2019

(65) Prior Publication Data
US 2020/0402378 A1 Dec. 24, 2020

Related U.S. Application Data

(60) Provisional application No. 62/637,161, filed on Mar. 1, 2018, provisional application No. 62/631,296, filed on Feb. 15, 2018.

(51) Int. Cl.
*H04W 4/029* (2018.01)
*H04W 4/38* (2018.01)
(Continued)

(52) U.S. Cl.
CPC ......... *G08B 13/1672* (2013.01); *G06F 16/61* (2019.01); *G06F 21/602* (2013.01);
(Continued)

(58) Field of Classification Search
CPC .... G08B 13/1672; G08B 17/06; G08B 25/14; H04W 4/90; H04W 4/38; H04W 4/029; H04W 76/50; H04L 67/22; G06F 3/011
(Continued)

(56) References Cited

U.S. PATENT DOCUMENTS

| 4,709,330 A | 11/1987 | Yokoi et al. |
| 5,504,717 A | 4/1996 | Sharkey et al. |

(Continued)

FOREIGN PATENT DOCUMENTS

| CN | 102 843 205 B | 12/2012 |
| EP | 1 806 952 A2 | 7/2007 |

(Continued)

OTHER PUBLICATIONS

International Preliminary Report on Patentability dated Aug. 27, 2020 from International Application No. PCT/IB2019/051202, filed on Feb. 14, 2019. 14 pages.

(Continued)

*Primary Examiner* — John A Tweel, Jr.
(74) *Attorney, Agent, or Firm* — HoustonHogle LLP

(57) ABSTRACT

A gunshot detection system includes a control panel that receives event data from gunshot sensor units detecting gunshots and generates location information pertaining to a shooting event based on the event data. The control panel includes a display on which a graphical user interface (GUI) is rendered. The GUI displays maps of a building with icons overlaid on the maps based on the generated location information. In one example, the GUI displays a map with an icon representing the active shooter, the position of the
(Continued)

icon with respect to the floorplan image corresponding to an area of the building. In another example, the GUI displays a map with icons representing different gunshot sensor units, the icons having different visual characteristics to indicate that the gunshot sensor units detected the gunshots and/or which of the gunshot sensor units was determined to be closest to the detected gunshots.

19 Claims, 7 Drawing Sheets

(51) Int. Cl.
| | |
|---|---|
| *H04W 4/90* | (2018.01) |
| *G08B 13/16* | (2006.01) |
| *G08B 17/06* | (2006.01) |
| *G08B 25/14* | (2006.01) |
| *G08B 25/10* | (2006.01) |
| *H04L 41/06* | (2022.01) |
| *G08B 17/00* | (2006.01) |
| *G08B 29/18* | (2006.01) |
| *G08B 29/24* | (2006.01) |
| *G06F 16/61* | (2019.01) |
| *H04W 12/037* | (2021.01) |
| *G06F 21/60* | (2013.01) |
| *G06Q 50/26* | (2012.01) |
| *H04L 9/08* | (2006.01) |
| *H04L 9/14* | (2006.01) |
| *H04W 56/00* | (2009.01) |
| *G08B 19/00* | (2006.01) |
| *G08B 25/04* | (2006.01) |
| *G07C 9/00* | (2020.01) |
| *G08B 7/06* | (2006.01) |
| *G08B 25/01* | (2006.01) |
| *H04W 84/18* | (2009.01) |
| *H04W 84/20* | (2009.01) |

(52) U.S. Cl.
CPC ....... *G06Q 50/265* (2013.01); *G07C 9/00182* (2013.01); *G08B 7/066* (2013.01); *G08B 17/00* (2013.01); *G08B 17/06* (2013.01); *G08B 19/00* (2013.01); *G08B 25/014* (2013.01); *G08B 25/04* (2013.01); *G08B 25/10* (2013.01); *G08B 25/14* (2013.01); *G08B 29/188* (2013.01); *G08B 29/24* (2013.01); *H04L 9/0894* (2013.01); *H04L 9/14* (2013.01); *H04L 41/06* (2013.01); *H04W 4/029* (2018.02); *H04W 4/38* (2018.02); *H04W 4/90* (2018.02); *H04W 12/037* (2021.01); *H04W 56/0015* (2013.01); *H04W 84/18* (2013.01); *H04W 84/20* (2013.01)

(58) Field of Classification Search
USPC ........................................................ 367/127
See application file for complete search history.

(56) References Cited

U.S. PATENT DOCUMENTS

| | | | |
|---|---|---|---|
| 5,973,998 A | 10/1999 | Showen et al. | |
| 6,552,963 B2 | 4/2003 | Baranek et al. | |
| 6,970,183 B1 | 11/2005 | Monroe | |
| 7,228,429 B2 | 6/2007 | Monroe | |
| 7,411,865 B2 | 8/2008 | Calhoun | |
| 7,460,006 B2 | 12/2008 | Kates | |
| 7,676,194 B2 | 3/2010 | Rappaport | |
| 7,843,356 B2 | 11/2010 | Webb | |
| 7,986,231 B1 | 7/2011 | Bentley et al. | |
| 8,149,649 B1 | 4/2012 | Brinn et al. | |
| 8,806,632 B2 | 8/2014 | Stefanidakis et al. | |
| 9,432,720 B2 | 8/2016 | Kruglick | |
| 9,642,131 B2 | 5/2017 | Bohlander et al. | |
| 9,672,700 B2 | 6/2017 | Lax | |
| 9,672,727 B1 | 6/2017 | Alexander et al. | |
| 9,679,459 B2 | 6/2017 | Crowe | |
| 9,830,932 B1 | 11/2017 | Gunderson et al. | |
| 9,888,371 B1 | 2/2018 | Jacob | |
| 10,089,845 B2 * | 10/2018 | Skorpik ................. G08B 21/02 |
| 10,102,732 B2 | 10/2018 | Gersten | |
| 10,586,109 B1 * | 3/2020 | Fowler ...................... G01J 5/10 |
| 10,657,800 B1 * | 5/2020 | Fowler ................... G01S 3/803 |
| 10,741,058 B1 | 8/2020 | Miller | |
| 10,928,244 B2 | 2/2021 | Warren et al. | |
| 11,170,619 B2 * | 11/2021 | Connell, II ............ G08B 25/10 |
| 11,282,536 B2 | 3/2022 | Davis et al. | |
| 2006/0109113 A1 | 5/2006 | Reyes et al. | |
| 2008/0165621 A1 | 7/2008 | Fisher et al. | |
| 2009/0222241 A1 | 9/2009 | Dorogi et al. | |
| 2010/0271905 A1 | 10/2010 | Khan et al. | |
| 2010/0305778 A1 * | 12/2010 | Dorneich ............. G05D 1/0044 |
| | | | 701/2 |
| 2011/0169633 A1 | 7/2011 | Lauder et al. | |
| 2014/0218518 A1 | 8/2014 | Oliver | |
| 2014/0222943 A1 | 8/2014 | Oleson et al. | |
| 2014/0269199 A1 | 9/2014 | Weldon et al. | |
| 2014/0277609 A1 | 9/2014 | Nye et al. | |
| 2014/0327543 A1 | 11/2014 | Showen et al. | |
| 2014/0340222 A1 | 11/2014 | Thornton et al. | |
| 2015/0061869 A1 | 3/2015 | Crowe et al. | |
| 2015/0070166 A1 | 3/2015 | Boyden et al. | |
| 2015/0077550 A1 | 3/2015 | Apelbaum et al. | |
| 2015/0339913 A1 | 11/2015 | Lyman et al. | |
| 2015/0347079 A1 | 12/2015 | Price et al. | |
| 2016/0232774 A1 | 8/2016 | Noland et al. | |
| 2016/0260307 A1 | 9/2016 | Skorpik et al. | |
| 2016/0269397 A1 | 9/2016 | Camenisch et al. | |
| 2016/0379456 A1 | 12/2016 | Nongpiur et al. | |
| 2017/0045336 A1 | 2/2017 | Crowe et al. | |
| 2017/0069190 A1 | 3/2017 | Hansen et al. | |
| 2017/0103643 A1 | 4/2017 | Powers, III et al. | |
| 2017/0169686 A1 | 6/2017 | Skorpik et al. | |
| 2017/0289650 A1 | 10/2017 | Schattmaier et al. | |
| 2017/0301220 A1 | 10/2017 | Jarrell et al. | |
| 2018/0053394 A1 | 2/2018 | Gersten | |
| 2018/0122030 A1 | 5/2018 | Raz et al. | |
| 2018/0160278 A1 | 6/2018 | Patel et al. | |
| 2018/0199179 A1 | 7/2018 | Rauner | |
| 2019/0130723 A1 | 5/2019 | Thiel et al. | |
| 2019/0213901 A1 * | 7/2019 | Kur ....................... F41G 3/2622 |
| 2019/0347920 A1 | 11/2019 | Anderson et al. | |
| 2021/0158837 A1 | 5/2021 | Saki et al. | |
| 2021/0202067 A1 | 7/2021 | Williams et al. | |

FOREIGN PATENT DOCUMENTS

| | | |
|---|---|---|
| EP | 3032508 A1 | 6/2016 |
| JP | 2001236822 A | 8/2001 |
| JP | 4973380 B2 | 7/2012 |
| JP | 2017520831 | 7/2017 |
| WO | WO 9110980 | 7/1991 |
| WO | WO 2010039130 | 4/2010 |
| WO | WO 2010111556 | 9/2010 |
| WO | WO 2011134371 | 11/2011 |
| WO | WO 2012092562 | 7/2012 |
| WO | WO 2018044553 | 3/2018 |
| WO | WO 2018044556 | 3/2018 |
| WO | WO 2018185723 | 10/2018 |
| WO | WO 2019159098 | 8/2019 |
| WO | WO 2019159099 | 8/2019 |
| WO | WO 2019159100 | 8/2019 |
| WO | WO 2019159101 | 8/2019 |
| WO | WO 2019159102 | 8/2019 |
| WO | WO 2019159103 | 8/2019 |

(56) References Cited

FOREIGN PATENT DOCUMENTS

| WO | WO 2019159104 | 8/2019 |
|----|---------------|--------|
| WO | WO 2019159105 | 8/2019 |

OTHER PUBLICATIONS

International Preliminary Report on Patentability dated Aug. 27, 2020, from International Application No. PCT/IB2019/051203, filed on Feb. 14, 2019. 7 pages.

International Preliminary Report on Patentability dated Aug. 27, 2020, from International Application No. PCT/IB2019/051204, filed on Feb. 14, 2019. 9 pages.

International Preliminary Report on Patentability dated Aug. 27, 2020, from International Application No. PCT/IB2019/051205, filed on Feb. 14, 2019. 23 pages.

International Preliminary Report on Patentability dated Aug. 27, 2020, from International Application No. PCT/IB2019/051206, filed on Feb. 14, 2019. 8 pages.

International Preliminary Report on Patentability dated Aug. 27, 2020, from International Application No. PCT/IB2019/051207, filed on Feb. 14, 2019. 8 pages.

International Preliminary Report on Patentability dated Aug. 27, 2020, from International Application No. PCT/IB2019/051208, filed on Feb. 14, 2019. 12 pages.

International Preliminary Report on Patentability dated Aug. 27, 2020, from International Application No. PCT/IB2019/051209, filed on Feb. 14, 2019. 12 pages.

International Preliminary Report on Patentability dated Aug. 27, 2020, from International Application No. PCT/IB2019/051210, filed on Feb. 14, 2019. 9 pages.

International Search Report and Written Opinion of the International Searching Authority, dated Jun. 18, 2019, from International Application No. PCT/IB2019/051202, filed on Feb. 14, 2019. 24 pages.

International Search Report and Written Opinion of the International Searching Authority, dated May 21, 2019, from International Application No. PCT/IB2019/051203, filed on Feb. 14, 2019. 13 pages.

International Search Report and Written Opinion of the International Searching Authority, dated May 14, 2019, from International Application No. PCT/IB2019/051204, filed on Feb. 14, 2019. 15 pages.

International Search Report and Written Opinion of the International Searching Authority, dated Jul. 12, 2019, from International Application No. PCT/IB2019/051205, filed on Feb. 14, 2019. 23 pages.

International Search Report and Written Opinion of the International Searching Authority, dated Jun. 12, 2019, from International Application No. PCT/IB2019/051206, filed on Feb. 14, 2019. 13 pages.

International Search Report and Written Opinion of the International Searching Authority, dated Jun. 14, 2019, from International Application No. PCT/IB2019/051207, filed on Feb. 14, 2019. 13 pages.

International Search Report and Written Opinion of the International Searching Authority, dated May 31, 2019, from International Application No. PCT/IB2019/051208, filed on Feb. 14, 2019. 18 pages.

International Search Report and Written Opinion of the International Searching Authority, dated Jul. 23, 2019, from International Application No. PCT/IB2019/051209, filed on Feb. 14, 2019. 20 pages.

International Search Report and Written Opinion of the International Searching Authority, dated May 24, 2019, from International Application No. PCT/IB2019/051210, filed on Feb. 14, 2019. 15 pages.

Partial Search Report dated Apr. 24, 2019, from International Application No. PCT/IB2019/051202, filed on Feb. 14, 2019. 14 pages.

Partial Search Report dated May 17, 2019, from International Application No. PCT/IB2019/051205, filed on Feb. 14, 2019. 13 pages.

Partial Search Report dated May 31, 2019, from International Application No. PCT/IB2019/051209, filed on Feb. 14, 2019. 12 pages.

* cited by examiner

GUNSHOT DETECTION SYSTEM WITH LOCATION TRACKING

RELATED APPLICATIONS

This application is a § 371 National Phase Application of International Application No. PCT/IB2019/051210, filed on Feb. 14, 2019, which claims the benefit under 35 USC 119(e) of U.S. Provisional Application No. 62/631,296, filed on Feb. 15, 2018, and U.S. Provisional Application No. 62/637,161, filed on Mar. 1, 2018, all of which are incorporated herein by reference in their entirety.

This application is related to:

International Application number PCT/IB2019/051202 filed Feb. 14, 2019, entitled "Gunshot detection system with forensic data retention, live audio monitoring, and two-way communication," now International Patent Publication No.: WO 2019/159098;

International Application number PCT/IB2019/051203 filed on Feb. 14, 2019, entitled "Gunshot detection system with master slave timing architecture," now International Patent Publication No.: WO 2019/159099;

International Application number PCT/IB2019/051204 filed on Feb. 14, 2019, entitled "Gunshot detection system with encrypted, wireless transmission," now International Patent Publication No.: WO 2019/159100;

International Application number PCT/IB2019/051205 filed on Feb. 14, 2019, entitled "Gunshot detection system with building management system integration," now International Patent Publication No.: WO 2019/159101;

International Application number PCT/IB2019/051206 filed on Feb. 14, 2019, entitled "Gunshot detection system anti-tampering protection," now International Patent Publication No.: WO 2019/159102;

International Application number PCT/IB2019/051207 filed on Feb. 14, 2019, entitled "Gunshot detection system with ambient noise modeling and monitoring," now International Patent Publication No.: WO 2019/159103;

International Application number PCT/IB2019/051208 filed on Feb. 14, 2019, entitled "Gunshot detection system with fire alarm system integration," now International Patent Publication No.: WO 2019/159104; and International Application number PCT/IB2019/051209 filed on Feb. 14, 2019, entitled "Gunshot detection sensors incorporated into building management devices," now International Patent Publication No.: WO 2019/159105.

All of the afore-mentioned applications are incorporated herein by this reference in their entirety.

BACKGROUND OF THE INVENTION

Shooting incidents, involving active shooters shooting victims within buildings such as schools or malls, are increasingly a concern. Identifying and reacting quickly to such incidents can reduce loss of life. For example, first responders need to know if gunshots have actually been fired and the location and number of the fired shots.

In confined areas, such as in a school or a private or public building, detecting and locating the source of gunshots is a complicated problem. A gunshot typically generates several sounds including the gunshot itself, the bullet's bow shockwave, noise from bullet impacts and noise of reflected gunshot sounds. In addition, numerous noises are generated in buildings that may be mistakenly identified as gunshots.

The broad concept of detecting gunshots utilizing acoustics is known. More specifically, it is known to provide a gunshot detection system including an array of acoustic sensors positioned in a pattern which enables signals from the sensors to be employed to not only detect the firing of a gunshot but to also locate the origin of the shot. One main requirement of such a system is the need to accurately distinguish between the sound produced from a gunshot and a host of other ambient sounds. In at least one known arrangement, a microphone is used to detect each sound, which is then amplified, converted to an electrical signal and then the electrical signal is compared with a threshold value above which a gunshot sound is expected to exceed.

Recently, gunshot detection systems with improved accuracy, dependability, and effectiveness have been described. One such system is described in International Publication Number WO 2018/044553, published on Mar. 8, 2018 and entitled "System and Method for Acoustically Identifying Gunshots Fired Indoors." This system provides for low false alarms or false positives and high detection rates by employing two microelectromechanical microphones (MEMs) having different sensitivity levels. Acoustic signals from a first microphone with lower sensitivity (for example, making the anomaly detection microphone essentially deaf to routine sounds) are first analyzed for a peak amplitude level large enough to be a potential gunshot. Then acoustic signals from a second microphone having a higher sensitivity are then analyzed further to confirm that the sound was a gunshot.

Gunshot detection methods have also been proposed that can count the number of gunshots fired, particularly from an automatic or fast acting weapon. One such method is described in International Publication Number WO 2018/044556, published on Mar. 8, 2018 and entitled "Method for Acoustically Counting Gunshots Fired Indoors." In this method, an acoustic signature of captured noise is analyzed to accurately count how many shots are fired. The method can be employed to identify that the gun is an automatic or rapid fire weapon, which information can be provided to emergency personnel.

Additionally, gunshot detection system that can accurately determine where sensed events are located have been proposed. One such system is described in International Publication Number WO 2018/185723, published on Oct. 11, 2018 and entitled "System and Method for Identifying and Locating Sensed Events." Here, a sensor network is employed to detect an event in the form of an audible signal. The event is time stamped and sent to a controller, which evaluates the event as either unique or a multiple detection using the sensor's time of alarm to determine which sensor activated first and to suppress subsequent alarms for the same event. This process is known as de-confliction.

SUMMARY OF THE INVENTION

It would be beneficial to enhance the capabilities of gunshot detection systems by providing a graphical depiction of where an active shooter is within a building and where they are moving. This location and/or movement information can be inferred based upon event data generated by gunshot sensor units of the gunshot detection system. For example, identification information for the closest gunshot sensor unit that detected a gunshot can be cross referenced against stored location information for the gunshot sensor units to determine the location of the shooter. More detailed location information could include or be based on timestamps for the detected gunshots or the order in which multiple gunshot sensor units detected the gunshots, to list a few examples.

The presently disclosed gunshot detection system includes a control panel that receives event data from the gunshot sensor units detecting the gunshots and generates location information pertaining to the shooting event based on the event data. The control panel includes a display (e.g. a touchscreen display) on which a graphical user interface (GUI) is rendered. The GUI displays maps (e.g. floorplan images) of the building with graphical elements (e.g. icons) overlaid on the maps based on the location information. The control panel can generate the location information and/or display the maps based on any available information, including possibly location information for other persons within the building such as building occupants, and/or first responders (provided, for example, by an indoor tracking system). In general, the visual characteristics and positions of the icons with respect to the map are based on the location information. In one example, the GUI displays a map with an icon representing the active shooter, the position of the icon with respect to the floorplan image corresponding to the area of the building depicted by that region of the image. In another example, the GUI displays a map with icons representing different gunshot sensor units, the icons having different visual characteristics to indicate that the gunshot sensor units detected the gunshots and/or which of the gunshot sensor units was determined to be closest to the detected gunshots.

A further enhancement of these gunshot detection systems would be to provide the systems with some way of tracking the occupants in the building. Occupants covers possibly the shooter, people seeking safety from that shooter, and first responders including police and medical personnel. In some examples, the present system incorporates occupant sensors into the gunshot sensor units in order to locate occupants within a region, such as a room of the building.

In general, according to one aspect, the invention features a system for detecting gunshots within a premises. The system comprises gunshot sensor units, which detect the gunshots and generate event data based on the detected gunshots, and a control panel. The control panel receives the event data, generates location information within the premises based on the event data and on a display of the control panel displays maps of the premises. On these maps, the control panel further displays graphical elements based on the location information.

In embodiments, the control panel generates the location information based on which of the gunshot sensor units detected the gunshots, stored location information for the gunshot sensor units, and/or time information included in event data for the detected gunshots. The location information might include an inferred route of movement of an active shooter through the premises (e.g. previous movement, current location and/or predicted future movement) and/or inferred proximity of the gunshot sensor units to the detected gunshots. The control panel can display the graphical elements with visual characteristics and/or overlaid on the maps in different positions with respect to the maps based on the location information. The graphical elements might represent the gunshot sensor units, persons within the premises and/or movement routes through the premises. The maps might include images depicting floorplans of the premises.

In general, according to another aspect, the invention features a method for detecting gunshots within a premises. Gunshots are detected and event data is generated based on the detected gunshots. Location information within the premises is generated based on the event data, and maps of the premises are displayed, with graphical elements on the maps based on the location information.

In general, according to another aspect, the invention features a gunshot sensor unit for detecting gunshots. The gunshot sensor unit comprises microphones for detecting acoustic anomalies and an occupancy sensor for detecting a presence of individuals.

In general, according to another aspect, the invention features a method, comprising detecting gunshots and generating event data based on the detected gunshots and generating location information within the premises based on the event data, along with additionally detecting a presence of individuals within the premises.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
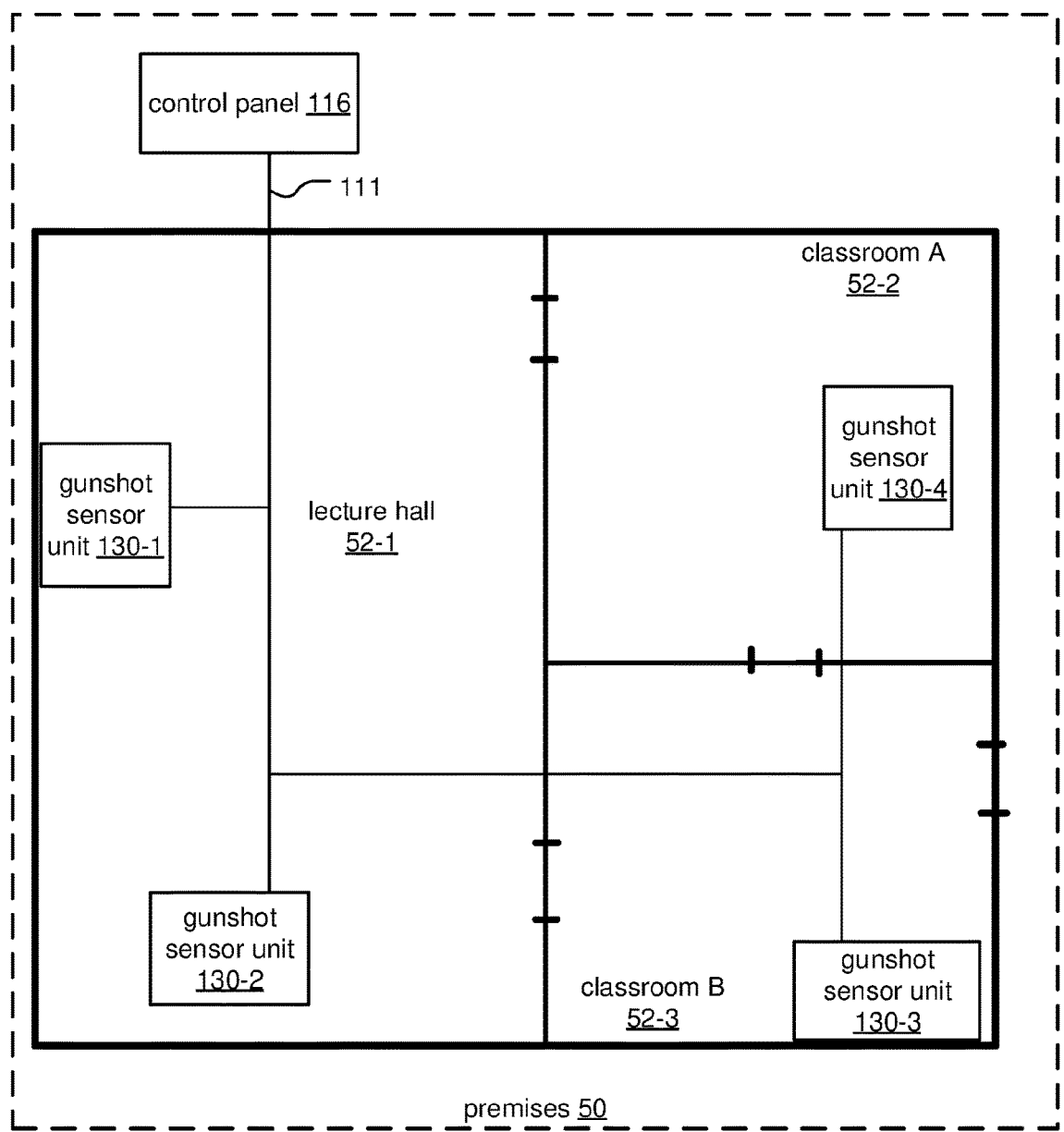
FIG. 1 is a schematic diagram of an exemplary gunshot detection system showing a common context for embodiments of the present invention.

FIG. 1 is a schematic diagram of an exemplary gunshot detection system 100.

In general, the gunshot detection system 100 monitors, detects and reports the occurrence of gunshots or other emergencies within a premises 50 such as a building (e.g. office, hospital, warehouse, retail establishment, shopping mall, school, multi-unit dwelling, government building).

In the illustrated example, the premises 50 is a simplified floor example of a building with three areas 52, a lecture hall 52-1, classroom A 52-2, and classroom B 52-3.

The gunshot detection system 100 includes gunshot sensor units 130 and a control panel 116, which communicate with each other over a communication network 111.

The gunshot sensor units 130 are distributed throughout the premises 50, for example, in areas 52 of the premises such as rooms, hallways, lobbies or stairways, to name a few examples. In the illustrated example, two gunshot sensor units 130-1, 130-2 are located in the lecture hall 52-1, while one gunshot sensor unit 130-4 is located in classroom A 52-2, and one gunshot sensor unit 130-3 is located in classroom B 52-3.

In general, the gunshot sensor units 130 detect conditions indicative of the gunshots or other emergencies and alert the control panel 116, which takes one or more responsive actions such as alerting building personnel, law enforcement, and/or a monitoring center, or collecting and presenting data pertaining to the detected gunshots to an operator of the control panel 116.

More specifically, the gunshot sensor units 130 detect acoustic anomalies indicating potential gunshots and generate audio data depicting the acoustic anomalies. The gunshot sensor units 130 might also detect the presence of persons in areas 52 of the premises 50 and generate occupancy information including, for example, information about quantities, identities, and/or locations of the present occupants. The gunshot sensor units 130 also generate event data based on and descriptive of the acoustic anomalies and locally store and/or send the event data to the control panel 116.

The event data often includes audio data (e.g. digitized audio clips) depicting the acoustic anomalies and metadata. This metadata includes, for example, time information indicating when the acoustic anomalies started and/or stopped, duration information for the acoustic anomalies and/or the audio data depicting the acoustic anomalies, file information, and identification information for the gunshot sensor unit 130 that detected the anomaly, and other sensor data generated by the gunshot sensor unit 130. Additionally, the event data might also include the occupancy information.

The control panel 116 directs the overall functionality of the gunshot detection system 100 by sending instructions (e.g. control messages) to be executed by the gunshot sensor units 130, receiving the event data from the gunshot sensor units 130 and taking the responsive actions based on the event data. The control panel 116 might receive preliminary event data (e.g. metadata indicating time and date information) from multiple gunshot sensor units 130 and perform a de-confliction process in order to determine which event data from the different sensor units 130 pertains to the same detected acoustic anomaly and which of the gunshot sensor units 130 is closest to the source of the acoustic anomaly based on, for example, which of the units first detected the acoustic anomaly. The control panel 116 might then send instructions to the gunshot sensor unit 130 closest to the source to send full event data (e.g. including a full audio data sample, environmental data, and other sensor data) to the control panel 116 for further processing and/or to be presented to the operator. The gunshot detection system control panel 116 also presents information to an operator of the control panel 116 and receives selections, for example, via a graphical user interface (GUI), the selections indicating configuration settings and/or actions to be taken by the control panel 116 with respect to the gunshot sensor units 130. The information presented by the control panel 116 via the GUI includes location information pertaining to detected gunshots and/or gunshot events in general. For example, the GUI displays maps of the premises, and on these maps are displayed graphical elements based on the location information.

The location information is generated by the control panel 116 based on the event data received from the gunshot sensor units 130. This location information might include an inferred route of movement (e.g. previous movement, current location, and/or predicted future movement) of an active shooter through the premises 50 or inferred proximity of the gunshot sensor units 130 to the detected gunshots, to list a few examples. The control panel 116 might generate the location information based on which of the gunshot sensor units 130 detected the gunshots, stored location information for the different gunshot sensor units 130, time information included in the event data (e.g. timestamps indicating when each gunshot was detected), and/or identification information for the different gunshot sensor units 130. In one example, the location information including the predicted future movement of the active shooter is generated based on a physical layout of the premises 50, occupancy density, and even fire alarm evacuation routes, among other examples. The location information for the active shooter is then inferred from this physical layout and then possibly updated if the shooter is identified based on other data such as video and/or image data from video surveillance systems (e.g. closed-circuit television) or from other location tracking and/or building management system sensors.

Figure 2:
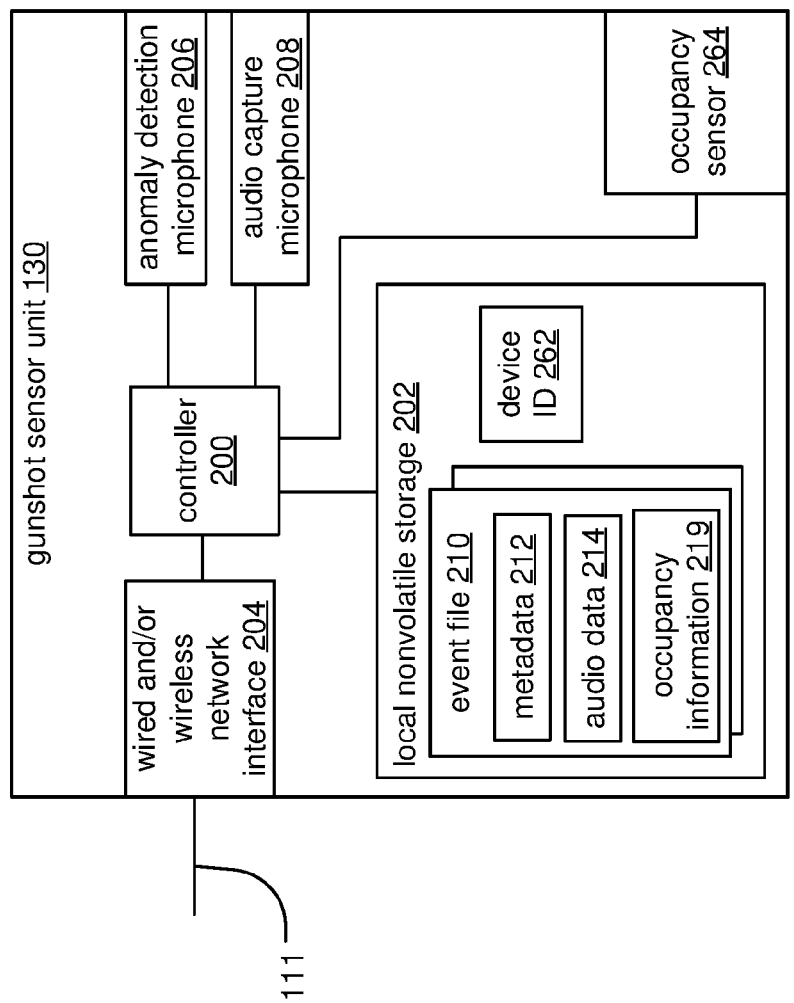
FIG. 2 is a block diagram showing an exemplary gunshot sensor unit of the gunshot detection system according to the present invention.

FIG. 2 is a block diagram showing an exemplary gunshot sensor unit 130.

The gunshot sensor unit 130 includes a controller 200, local nonvolatile storage 202, a wired and/or wireless network interface 204, an anomaly detection microphone 206, and an audio capture microphone 208. In some embodiments, including the illustrated embodiment, the gunshot sensor unit 130 might also include an occupancy sensor 264.

The wired and/or wireless network interface 204 provides connectivity with the gunshot detection system control panel 116 and possibly other devices via the gunshot detection communication network 111. In addition, the network also provides power to the devices, in many examples. Direct current (DC) might be superimposed upon the data that is transmitted between the devices and other nodes on the network. In other examples, the gunshot sensor units 130 might receive power from alternative power supplies such as a supervised power circuit or power storage mechanisms such as batteries.

In general, the controller 200 executes firmware/operating system instructions and generally directs the functionality of the gunshot sensor unit 130. In one example, the controller 200 is small single-board computer. In other examples, the controller is a microcontroller unit or a system on a chip (SoC), including one or more processor cores along with memory and programmable input/output peripherals such as analog to digital converters and digital to analog converters.

The anomaly detection microphone 206 detects certain acoustic anomalies, and the audio capture microphone 208 captures the acoustic anomalies and generates the audio data depicting the acoustic anomalies. In one embodiment, both microphones 206, 208 are micro electro-mechanical system (MEMS) microphones having different sensitivity levels, and the controller 200 is configured to sample the microphones 206, 208 such that outputs from the microphones can be continuously analyzed in near real time for an acoustic signature. The anomaly detection microphone 206 has the lower sensitivity level and a high clipping level, while the audio capture microphone 208 has the higher sensitivity level. The audio capture microphone 208 continuously captures ambient sound, which is stored in a 9.9 second (for example) loop in a ring buffer of the controller 200. At the same time, incoming acoustic signals from the anomaly detection microphone 206 are continuously analyzed to detect acoustic anomalies, particularly by searching the incoming acoustic signal for a peak amplitude level large enough to be at least preliminarily identified as a gunshot.

Once an indication of a possible gunshot has been triggered utilizing the anomaly detection microphone 208, further processing may be performed by the controller 200. The controller 200 analyzes the sound stored in the loop to confirm that the acoustic anomaly is a gunshot. If confirmed as gunshot, the controller generates audio data including the captured sound stored in the loop buffer, which would include the acoustic anomaly and the previously captured sound (up to 9.9 seconds, in this example). The audio data 214 is often stored in the local nonvolatile storage 202 associated with different event files 210 or instances of event data for different gunshot detection events, along with the metadata 212, which includes the time and/or date information for the events.

In general, the occupancy sensor 264 detects the presence of individuals in the areas 52 of the premises 50 and generates occupancy information 219, which can be stored in the local nonvolatile storage 202 as part of the event files 210 containing the event data.

The occupancy sensor 264 is a look-down sensor in the typical embodiment where the gunshot sensor unit 130 is installed on the ceiling of the area 52. Its field of view covers a hemispherical region under the unit 130, i.e., negative elevation angles 0 to −90 degrees, through 360 degrees in azimuth. That said, in other examples when the gunshot sensors are installed on a vertically extending wall, then the occupancy sensor 264 will look out along a horizontal line across the room.

In any event, the occupancy sensor 264 relies on different technologies in different embodiments.

For example, in one case, the occupancy sensor 264 is a single element pyroelectric passive infrared (PIR) sensor. These devices detect levels of infrared radiation and are used to detect the existence of occupants by their heat signature and can typically detect gross movement of those occupants. The PIR occupancy sensor 264 is also preferably used to produce an estimate of the number of occupants in the corresponding area 52.

In other examples, the occupancy sensor 264 is a Gigahertz (GHz) imaging system. For example, reasonably high-resolution images in real time can be generated using GHz imaging sensors operating in the 3 GHz-81 GHz frequency range using two dimensional arrays of 10's to 100's of transmitters and receivers. Multiple signals are sent, received and analyzed enabling the creation of high-resolution 3D images. Due to the high numbers of transceivers and receivers and advanced digital signal processing, the GHz imaging sensors can be used to track occupants with high accuracy.

In still other examples, the occupancy sensor 264 includes a thermal imaging focal plane pixel array sensor operating at ambient temperature, or stabilized at a temperature close to ambient using small temperature control elements. These spatially resolved sensors typically have arrays with 10's to 100's or more of rows and columns of pixels. Common technologies include pyroelectric, ferroelectric, and microbolometer based sensors.

In still other examples, the occupancy sensor is a visible or visible-to-infrared camera. In embodiments, the local nonvolatile storage 202 could be fixed storage such as flash memory, or removable storage such as an SD card, among other examples. Also stored in the local nonvolatile storage 202 is identification information such as a sensor ID 262, which is a globally unique identifier associated with the gunshot sensor unit 130, such as a serial number or a media access control (MAC) address assigned to the network interface 204, to list a few examples. The sensor ID 262 is included with the event data sent by the gunshot sensor unit 130 to the control panel 116 to be used to identify incoming event data and, for example, generate location information for the detected gunshots by looking up the location of the gunshot sensor unit 130 based on the sensor ID 262.

In another example, the occupancy sensor 264 includes a wireless transceiver for detecting radiofrequency signals according to IEEE 802.15 standards, such as Bluetooth or Bluetooth Low Energy and/or reading radiofrequency identification (RFID) tags. Individuals such as occupants, armed personnel including law enforcement officers or security personnel and/or first responders are then equipped with active or passive radiofrequency identification (RFID) tags and/or other user devices which broadcast wireless beacon signals including, for example, identification information for the tags and/or the individuals. These RFID tags and/or user devices might be the same devices or otherwise compatible with the frictionless access control systems for the premises 50, which control access through access points (e.g. doors, elevators, escalators, turnstiles) to restricted areas of the premises 50 via door readers and/or door controllers. The door controllers receive the broadcast identification information via the door readers and control access through the access points based on the identification information. In this case, the occupancy sensor 264 would receive the broadcast identification information for the active or passive RFID tags or the Bluetooth beacons and send the information to the control panel 116, which would resolve the identity and location of the individual based on the identification information and the location of the gunshot sensor unit 130.

In still another example, the occupancy sensor 264 includes a low frequency RADAR sensor (operating in a 3-80 GHz range, for example), which is used to generate position information indicating positions with respect to the gunshot sensor unit 130 of bodies in the area 52 where the gunshot sensor unit 130 is located, such as those of an active shooter or occupants of the premises 50. The position information preferably further includes information indicating relative spatial position as well as body position (e.g. upright, prone), along with physiological indicators. The position information is generated and stored with the event data and sent to the control panel 116 to determine occupancy of the areas 52 of the premises 50.

In one embodiment, the occupancy sensor could include both the low frequency RADAR sensor operating in conjunction with the previously described wireless transceiver and/or antenna for receiving radiofrequency signals according to IEEE 802.15 standards such as Bluetooth or Bluetooth Low Energy, among other examples. In this case, the control panel 116 determines whether there were individuals detected via the low frequency RADAR sensor that were not detected via the wireless receiver and infer that the unidentified individual (e.g. without an actively transmitting tag) is the active shooter and/or a victim/civilian.

Figure 3:
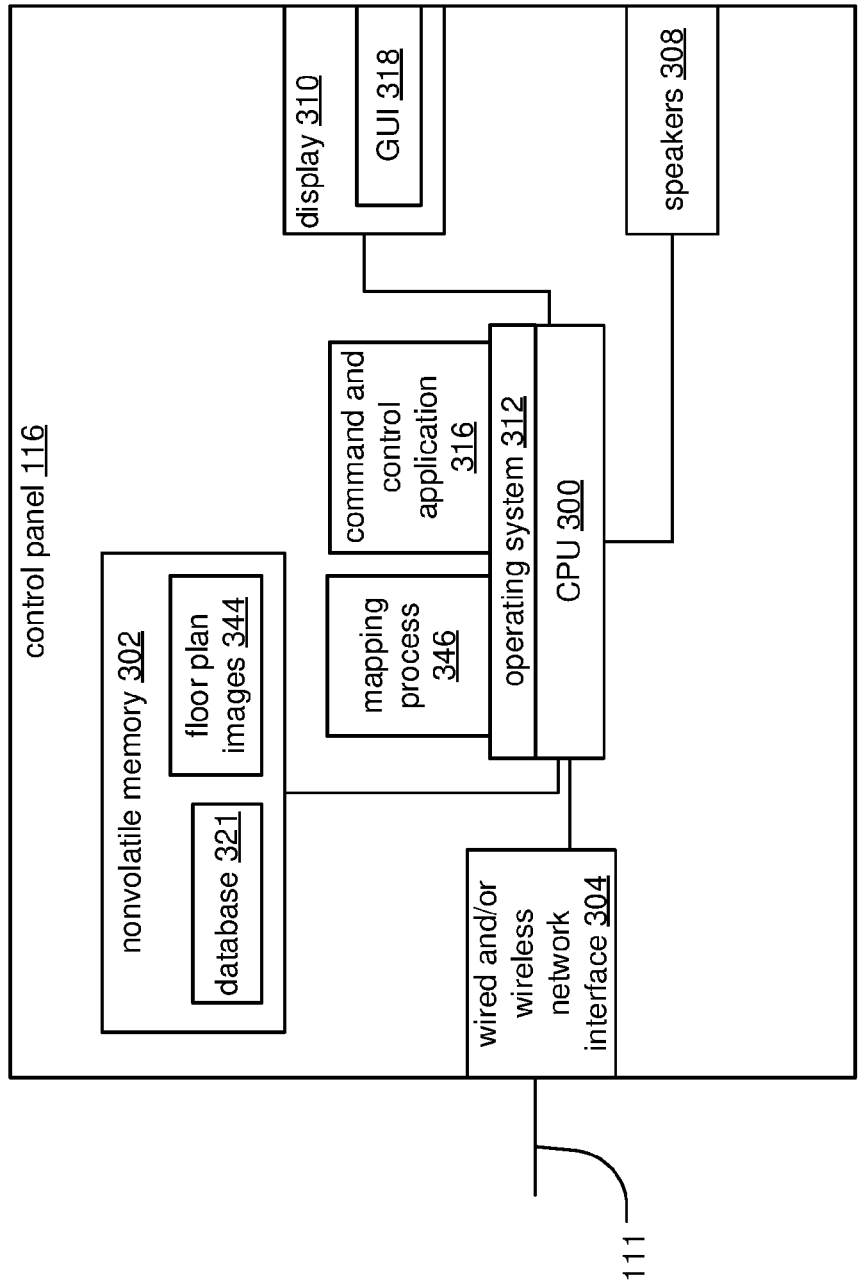
FIG. 3 is a block diagram showing an exemplary control panel of the gunshot detection system according to the present invention.

FIG. 3 is a block diagram showing an exemplary gunshot detection control panel 116.

The control panel 116 includes a central processing unit (CPU) 300, nonvolatile memory 302, a wired and/or wireless network interface 304, and a display 310.

Similar to analogous components on the gunshot sensor units 130, the wired and/or wireless network interface 304 provides connectivity with the gunshot sensor units 130 and possibly other devices via the gunshot detection communication network 111. In some examples, the control panel 116 may also supply power to the units 130.

The CPU 300 executes firmware instructions and an operating system (OS) 312 and generally directs the functionality of the control panel 116. The OS 312 interfaces with the hardware components of the control panel 116 for access by a command and control application 316, which is a software process executing on top of the OS 312.

Stored in the nonvolatile memory 302 are a local database 321 maps 344 for the premises 50.

In general, the maps 344 are digital representations of the premises 50, including an interior layout of the premises (e.g. positions of areas 52 within the premises 50 with respect to each other). The maps 344 might include visual depictions of the premises 50, such as two- or three-dimensional drawings or models, images depicting floorplans of the premises 50 or building information models (BIM), for example. The maps 344 could also include location information for physical and functional characteristics of the premises 50, identification information for different areas 52 of the premises 50 (e.g. room numbers), and/or other reference information for the premises 50 that can be used by the control panel 116 to interpret the maps 344, for example, in order to overlay graphical elements on the maps in a meaningful way. During a configuration process for the gunshot detection system 100, the intended positions of the gunshot detection system 100 might be indicated with respect to the maps 344.

In general, the database 321 stores gunshot event data and location information for the premises 50, the gunshot sensor units 130, and occupants of the premises 50. The location information for the premises 50 identifies key reference locations throughout the premises 50 such as names of areas 52 (e.g. room numbers) and/or coordinates (e.g. for global navigation satellite systems or indoor location tracking systems). The locations are associated with the maps 344, for example, via map position information indicating regions of a two-dimensional visual depiction of the premises 50 corresponding to the different locations in the premises 50. These reference locations are also associated with the gunshot sensor units 130, occupants of the premises 50, and gunshot detection events. Other than location information, the database 321 also stores event data and audio data received from the gunshot sensor units 130 as well as information generated by the control panel 116 such as order information indicating the order in which the gunshot sensor units 130 detected the gunshots, and proximity information indicating the proximity of the gunshot sensor units 130 to the detected gunshots. In some embodiments, the relative times at which the gunshots were detected are used to triangulate the location of the origin of the gunshot based on the speed of sound.

The command and control application 316, in general, generates a graphical user interface (GUI) 318 that is rendered on the display 310 (e.g. touchscreen display) of the control panel 116. The GUI 318 presents gunshot detection system information (status information, event data, location information for the devices of the gunshot detection system), and receives input indicating configuration settings, for example. The GUI 318 also presents location information for the gunshot detection system 100 and/or premises 50. For example, during normal operation, the GUI 318 might display a graphical depiction of the locations of the different gunshot sensor units 130, whereas during a gunshot detection event, the GUI 318 might display a graphical depiction of an active shooter's location or the locations of other persons within the premises 50 based, for example, on the occupancy information 219 generated by the gunshots sensor units 130 via the occupancy sensors 264 and received along with the event data by the control panel 116. In one embodiment, the GUI 318 displays the maps 344 of the premises 50 with graphical elements overlaid on the maps 344 representing persons, gunshot sensor units 130, or movement routes through the premises 50, among other examples. In one embodiment, the command and control application 316 communicates with other devices to display the GUI 318 on displays of the other devices, including remote devices that are not within the premises 50 and which are connected to the control panel 116 via a public network such as the internet.

A mapping process 346 also executes on the CPU 300. In general, the mapping process 346 generates icon information for the graphical elements to be overlaid on the maps 344, including position information indicating a position with respect to the map 344 (e.g. a region of the map 344) that the graphical element should be overlaid, and attributes indicating physical characteristics of the graphical elements. In one example, the mapping process 346 might generate the icon information by translating location information for a gunshot detection event into coordinates indicating a position for a graphical element to be overlaid with respect to the map 344. The coordinates could be generated based on the location information the premises 50, the gunshot sensor units 130, and occupants of the premises 50 stored in the database 321.

Figure 4:
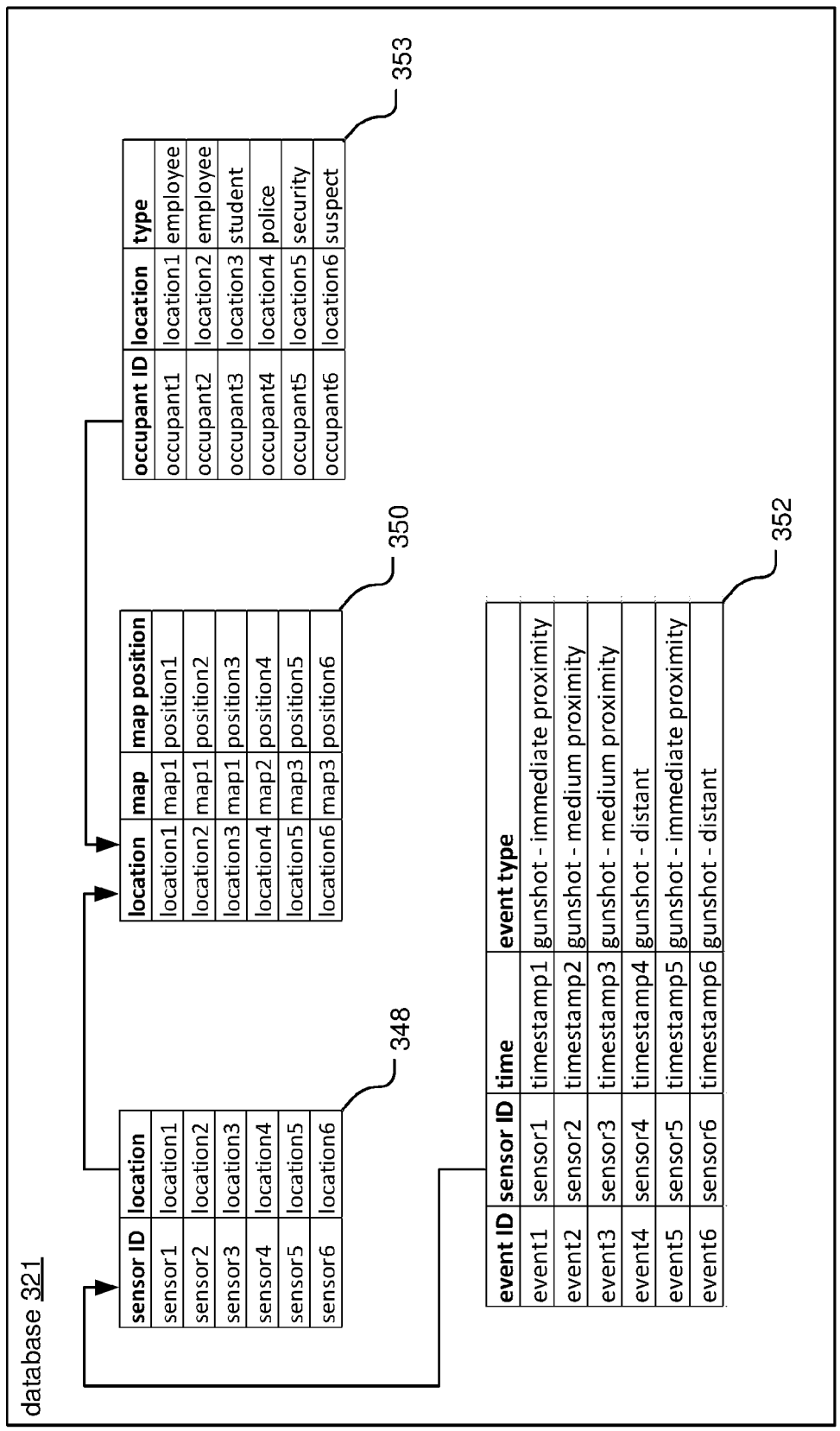
FIG. 4 is a diagram showing exemplary location information maintained by the control panel.

FIG. 4 is a diagram showing exemplary location information stored by the control panel 116 in the database 321.

The database 321 includes a sensor table 348, a location table 350, a gunshot event table 352, and an occupant table 353.

The location table 350 stores the location information for the premises 50, particularly location information for particular features of the premises 50 with respect to the maps 344. The location table 350 includes a location ID column, a map column and a map position column. The location ID column includes unique identification information for the location within the premises 50. The map column includes map information for each location, for example, indicating an image file for the map 344 depicting the particular location. The map position column includes position information for the location with respect to the map 344, such as coordinates indicating a region of the map 344 corresponding to the location.

The sensor table 348 stores the location information for the gunshot sensor units 130 and includes a sensor ID column and a location column. The sensor ID column includes unique identification information for the units. The location column includes location information indicating a location within the premises 50 (e.g. a room 52 or part of a room, coordinates) where the gunshot sensor unit 130 is located. Values in the sensor location column might refer to the same values in the location column in the occupant table 353 and/or the location table 350.

The occupant table 353 stores the location information for the occupants of the premises 50 and includes columns for occupant ID, location, and type. The occupant ID column includes unique identification information for each occupant. The occupant location column includes location information for the occupant indicating a location within the premises 50 where the occupant is known and/or expected to be located. Values in the occupant location columns might refer to the same values in the location column in the sensor table 348 and/or the location table 350. The type column includes descriptive text about the occupant such as the occupant's relationship to the premises 50 or shooting event (e.g. employee, student, police, security, suspected shooter). In general, the location information for the occupants stored in the occupant table 353 could be generated by the control panel 116 based on any information available to the control panel 116. For example, in an embodiment in which the gunshot sensor units 130 include occupancy sensors 264, the location information for the occupants might be based on the occupancy information 219 generated by the gunshots sensor units 130 via the occupancy sensors 264. In other embodiments (e.g. wherein the gunshot sensor units 130 do not include the occupancy sensors 264) the location information for the occupants might be based on real-time location information provided via an indoor tracking system of the premises 50, other types of sensors of building management systems of the premises 50 or schedule information for occupants of the building indicating locations where occupants are expected to be at certain times, among other examples. This location information provided by sensors or other means would be cross-referenced with the gunshot detection system 100 via the occupant table 353, in one example. In one example, the location information in the occupant table 353 include or be based on access control system event data indicating when the occupants engaged with access points at different locations throughout the building.

The gunshot event table 352 includes recorded event information for ongoing or past gunshot events and includes columns for event ID, sensor ID, time, and event type. The event ID column includes unique identification information for each event, which can refer either to collective shooting events or discrete gunshot detection events in different examples. The sensor ID column identifies the gunshot sensor unit 130 or units involved in the event, referring, for example, to values in the sensor ID column in the sensor table 348. The time column includes time information for the gunshot events, including, for example, timestamps for the detected gunshots. The event type column includes, for example, descriptive text about the event that might be presented to operators of the control panel 116 and/or used to determine visual characteristics of the graphical elements displayed on the map 344. In the illustrated example, the event type column includes proximity information indicating inferred proximities of the gunshot sensor units 130 to the detected gunshots.

Figure 5:
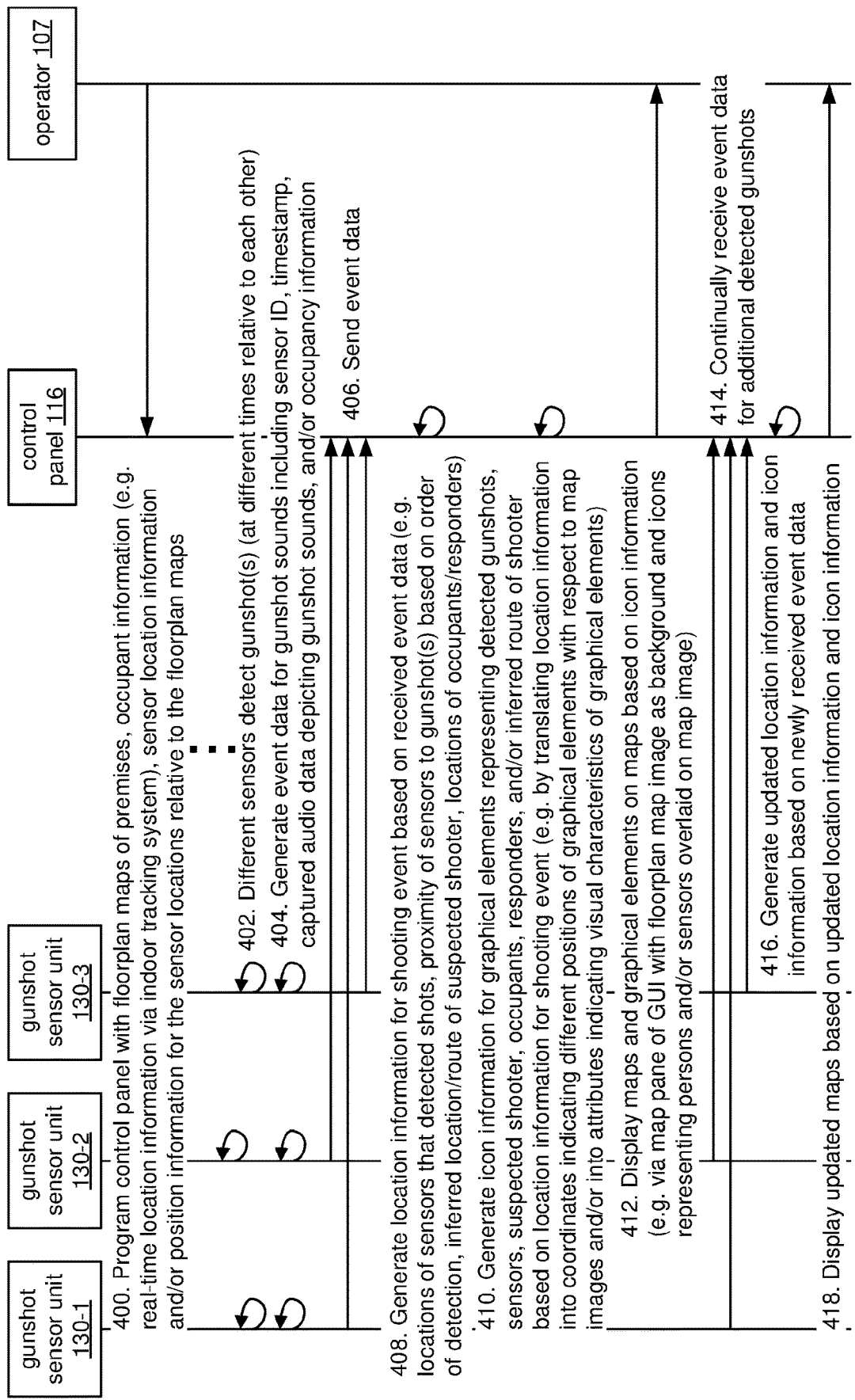
FIG. 5 is a sequence diagram illustrating a process by which the gunshot detection system generates and displays location information for gunshot events via a graphical user interface (GUI) rendered on a display of the control panel.

FIG. 5 is a sequence diagram illustrating a process by which the gunshot detection system 100 displays the location information for the gunshot events via the GUI 318 of the control panel 116.

First, in step 400, an operator 107 of the control panel 116 programs the control panel 116 with the maps 344 (e.g. floorplan images), occupant information (e.g. real-time location information via an indoor tracking system and/or occupant schedule information), sensor location information, and/or position information for the locations within the premises 50 with respect to the maps 344. This might be performed during an initial configuration stage.

In step 402, different gunshot sensor units 130 detect gunshots at different times relative to each other. For example, gunshot sensor unit 130-2 detects gunshots before gunshot sensor units 130-1, 130-3.

In step 404, the gunshot sensor units 130 generate event data based on the detected gunshots, including timestamps and/or captured audio data depicting the gunshots. The event data generated by the gunshot sensor units 130 might also include the occupancy information 219 generated via the occupancy sensors 264 of the gunshot sensor units 130 in embodiments in which the gunshot sensor units include the occupancy sensors 264. This event data might be stored in the event file 210 in the local nonvolatile storage 202 for each gunshot sensor unit 130. In step 406, the gunshot sensor units 130 send the event data to the control panel 116 along with their own device IDs 262.

In step 408, the control panel 116 generates location information for the shooting event based on the event data and/or the sensor IDs. For example, the control panel 116 might determine the locations of the gunshot sensor units 130 that detected the shots based on the received device IDs 262 by retrieving the locations associated with the IDs in the sensor table 348 of the database 321, determine the proximity of the sensors to the gunshots based on the order of detection (e.g. via the timestamps for each detected gunshot), generate inferred location/route information of an active shooter based on the locations of the sensors 130 detecting the gunshots (retrieved from the sensor table 348) and the times at which the gunshots were detected (retrieved from the gunshot event table 352), or determine locations of the shooter and/or other persons within the building (e.g. occupants, first responders) based on location information retrieved from the occupant table 353 and/or, in one embodiment, based on the occupancy information 219 generated by the gunshot sensor units 130 via the occupancy sensors 264.

In step 410, the control panel 116 generates icon information for graphical elements to be overlaid on the map 344 displayed by the GUI 318 based on the location information for the shooting event. The graphical elements might represent the detected gunshots, the gunshot sensor units 130, the active shooter, the occupants and responders, and/or inferred movement route of the shooter through the premises 50. In one example, the mapping process 346 executing on the CPU 300 of the control panel 116 translates the location information for the gunshot detection event into coordinates indicating positions for graphical elements to be overlaid with respect to the map 344 and/or attributes indicating visual characteristics of the graphical elements.

In step 412, the control panel 116 displays to the operator 107 the maps 344 with overlaid graphical elements based on the icon information. In one example, the GUI 318 includes a pane with a floorplan map image as its background and icons representing persons and/or sensors 130 overlaid on the map image.

In step 414, the control panel 116 continually receives the event data for additional detected gunshots from the gunshot sensor units 130. In step 416, the control panel 116 generates updated location information for the shooting event and updated icon information based on the updated event data. The control panel 116, in step 418, displays updated maps 344 based on the updated location information and updated icon information.

Figure 6:
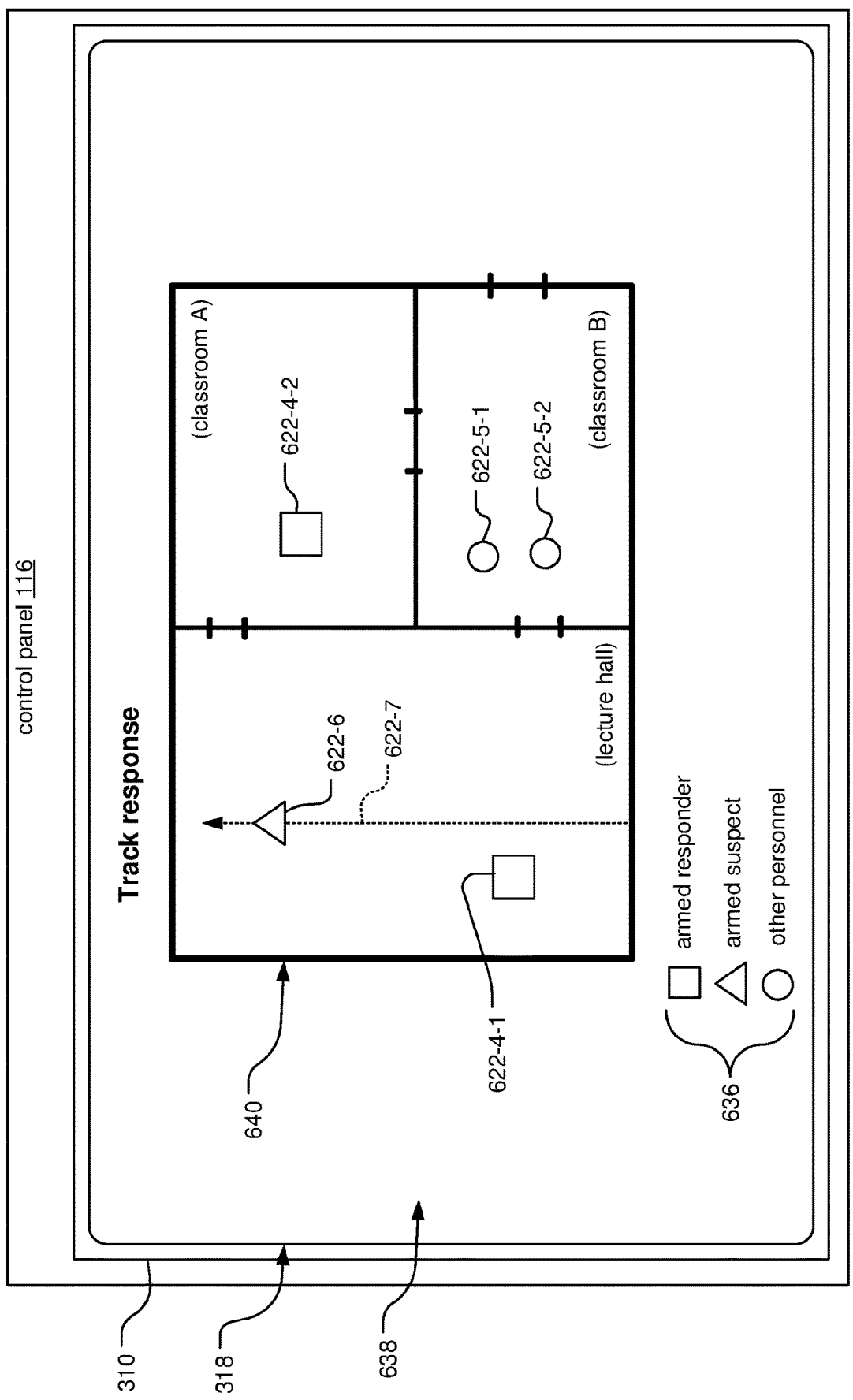
FIG. 6 is an illustration of an exemplary track response screen of the GUI according to one embodiment.
Figure 7:
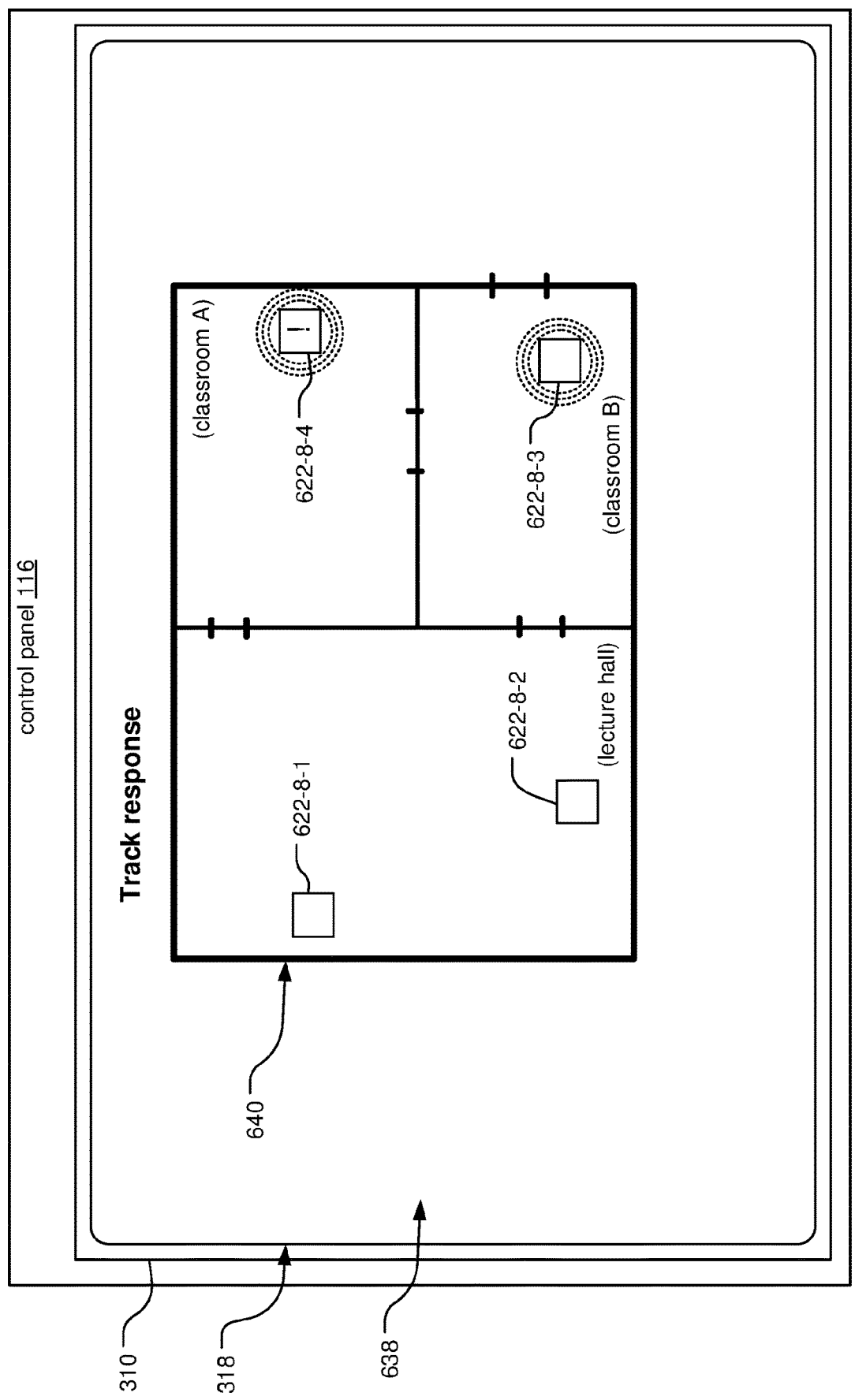
FIG. 7 is an illustration of an exemplary track response screen according to another embodiment.

FIGS. 6 and 7 are illustrations of exemplary screens of the GUI 318 rendered on the display 310 of the control panel 116. In general, the screens include a map pane 640, which presents the map 344, for example, as a background image, with various graphical elements overlaid on the map 344. The graphical elements include indicators representing persons (e.g. shooter, occupant, armed responder), gunshot sensor units 130, and/or the inferred route of the shooter. The indicators are generally icons that might include textual information descriptive of the objects represented by the indicators and/or different visual characteristics based on the gunshot detection event.

More specifically, FIG. 6 shows a track response screen 638, which might be displayed during a gunshot detection event, for example, at steps 412 and/or 418 as described with respect to FIG. 5. In general, the track response screen presents a graphical depiction of the shooter's location during a gunshot detection event.

As previously described, the track response screen 638 includes the map pane 640 displaying the map 344. The map image roughly corresponds to the premises 50 illustrated in FIG. 1, with different areas delineated with solid lines and denoted with textual information (e.g. "lecture hall", "classroom A", "classroom B"). This textual information could be part of the map image or could be graphical elements overlaid on the map 344, for example, based on location information in the location table 350. Overlaid on the map 344 presented in the map pane 640 are graphical elements, specifically, a shooter indicator 622-6, occupant indicators 622-5, armed responder indicators 622-4, and an inferred route indicator 622-7. The shooter indicator 622-6, which is a triangular shaped icon, represents the current location of the active shooter, while the inferred route indicator 622-7, which is a dashed line with an arrow, represents the previous and predicted future movements of the shooter. The armed responder indicators 622-4, which are square shaped icons, represent armed responders such as police and/or security personnel. The occupant indicators 622-5 represent occupants of the premises 50 such as employees and/or students of entities occupying the premises 50. The different positions of the indicators 622 with respect to the map image correspond to the location of the represented person/route. For example, the shooter indicator 622-6 overlaid on a region of the map 344 labeled "lecture hall" and depicting a floorplan of the lecture hall 52-1 indicates that the active shooter was determined, based on the event data from the gunshot sensor units 130, to be located in the lecture hall 52-1.

These icons representing the shooter, armed responders, occupants and/or other individuals performing other roles such as first responders might have different visual properties such as colors based on the roles of the represented individuals. Red icons might represent victims, blue icons might represent law enforcement, or black icons might represent the shooter, among other examples. Triage tag icons with visual properties indicating different levels of priority (e.g. seriousness of injury) might be used to enable responders to focus resources and an operational approach to their response based on the triage tag icons.

The track response screen 638 also includes an object legend 636, which includes sample indicators 622 of different types paired with textual information identifying the objects (e.g. persons) represented by each type, including "armed responder", "armed suspect", and "other personnel".

FIG. 7 shows another example of the track response screen 638 according to another embodiment of the gunshot detection system 100. As before, the track response screen 638 includes the map pane 640 displaying the map 344 with graphical elements (e.g. object indicators 622) overlaid on the map 344. Now, however, the indicators are sensor indicators 622-8, which are square-shaped icons representing the different gunshot sensor units 130. The gunshot sensor units 130 having a static location within the premises 50, the sensor indicators 622-8 are displayed in fixed positions relative to the map 344 corresponding to the location of the gunshot sensor units 130 within the premises 50. Instead of communicating the location of the active shooter and/or detected gunshots based on the varying position of the indicators 622 with respect to the map 344, in this example, the locations are presented through varying visual characteristics of the sensor indicators 622-8. For example, the sensor indicators 622-8-3 and 622-8-4 include concentric dashed circles surrounding the square shape of the icon, indicating that the gunshot sensor units 130 represented by the sensor indicators 622-8-3, 622-8-4 detected the gunshots based on the event data. In another example, the sensor indicator 622-8-4 includes an exclamation point symbol, indicating that the gunshot sensor unit 130 represented by the sensor indicator 622-8-4 was the first gunshot sensor unit 130 to detect the most recent gunshot, indicating that this gunshot sensor unit 130 is in closest proximity to the detected gunshot and thus the active shooter.

While this invention has been particularly shown and described with references to preferred embodiments thereof, it will be understood by those skilled in the art that various changes in form and details may be made therein without departing from the scope of the invention encompassed by the appended claims.

What is claimed is:

1. A system for detecting gunshots within a premises, the system comprising:
   gunshot sensor units for detecting gunshots and generating event data based on the detected gunshots, wherein the gunshot sensor units include occupancy sensors for detecting a presence of persons and generating occupancy information including locations of suspects, responders and others; and
   a control panel for receiving the event data and occupancy information and generating location information within the premises based on the event data, the control panel comprising a display for displaying maps of the premises and displaying on the maps graphical elements based on the location information,
   wherein the graphical elements represent the gunshot sensor units, persons within the premises and/or movement routes through the premises with different indicators being respectively displayed on the maps for the suspects, responders and others based on the occupancy information.

2. The system as claimed in claim 1, wherein the location information generated by the control panel includes an inferred route of movement of an active shooter through the premises.

3. The system as claimed in claim 2, wherein the inferred route of movement of the active shooter indicates previous movement, current location and/or predicted future movement of the active shooter.

4. The system as claimed in claim 1, wherein the location information generated by the control panel is based on which of the gunshot sensor units detected the gunshots and/or stored location information for the gunshot sensor units that detected the gunshots.

5. The system as claimed in claim 1, wherein the location information generated by the control panel is based on time information included in the event data for the detected gunshots.

6. The system as claimed in claim 1, the location information generated by the control panel includes inferred proximity of gunshot sensor units to the detected gunshots.

7. The system as claimed in claim 1, wherein the control panel displays the graphical elements with different visual characteristics and/or overlaid on the maps in different positions with respect to the maps based on the location information.

8. The system as claimed in claim 1, wherein the maps include images depicting floorplans of the premises.

9. A method for detecting gunshots within a premises, the method comprising:
  detecting gunshots and generating event data based on the detected gunshots;
  providing occupancy sensors for detecting a presence of persons and generating occupancy information including locations of suspects, responders and others;
  generating location information within the premises based on the event data; and
  displaying maps of the premises and displaying on the maps graphical elements based on the location information, wherein the graphical elements represent gunshot sensor units detecting the gunshots, persons within the premises and/or movement routes through the premises with different indicators being respectively displayed on the maps for the suspects, responders and others based on the occupancy information.

10. The method as claimed in claim 9, further comprising generating the location information based on inferring a route of movement of an active shooter through the premises.

11. The method as claimed in claim 10, wherein the inferred route of movement of the active shooter indicates previous movement, current location and/or predicted future movement of the active shooter.

12. The method as claimed in claim 9, further comprising generating the location information based on which gunshot sensor units detected the gunshots and/or based on stored location information for the gunshot sensor units that detected the gunshots.

13. The method as claimed in claim 9, further comprising generating the location information based on time information included in the event data for the detected gunshots.

14. The method as claimed in claim 9, further comprising generating the location information based on occupancy information generated via occupancy sensors for detecting a presence of persons.

15. The method as claimed in claim 9, further comprising generating the location information based on inferring proximity to the detected gunshots of gunshot sensor units detecting the gunshots.

16. The method as claimed in claim 9, further comprising displaying the graphical elements with different visual characteristics and/or overlaid on the maps in different positions with respect to the maps based on the location information.

17. The method as claimed in claim 9, wherein the maps include images depicting floorplans of the premises.

18. A gunshot sensor unit for detecting gunshots, the gunshot sensor unit comprising:
  microphones for detecting acoustic anomalies; and
  an occupancy sensor for detecting a presence of individuals and generating position information indicating relative spatial positions, upright or prone body positions, and physiological indicators of detected individuals in an area where the gunshot sensor unit is located.

19. A method, comprising:
  detecting gunshots and generating event data based on the detected gunshots with a gunshot sensor unit;
  generating location information within the premises based on the event data; and
  detecting a presence of individuals within the premises and generating position information indicating relative spatial positions, upright or prone body positions, and physiological indicators of detected individuals in an area where the gunshot sensor unit is located.

* * * * *